(No Model.)
W. STANLEY, Jr.
ALTERNATE CURRENT ELECTRIC MOTOR.
No. 508,188. Patented Nov. 7, 1893.
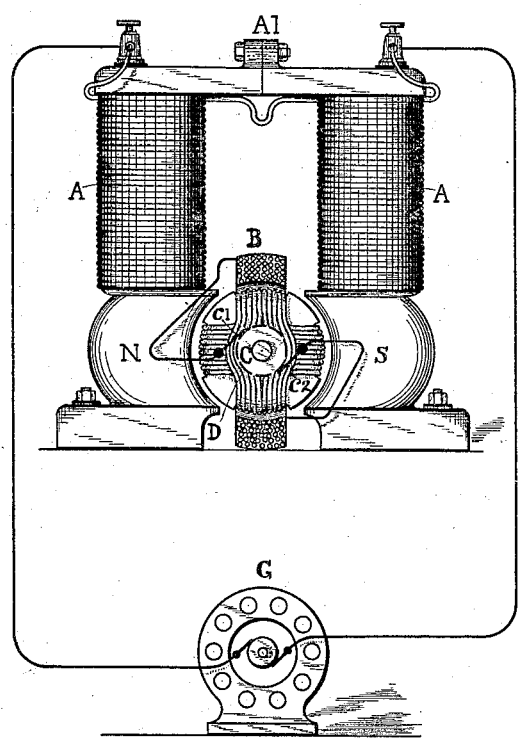
WITNESSES:
George Brown Jr.
Caroline E. Davidson
INVENTOR,
WILLIAM STANLEY JR.
By Pope, Edgecomb & Ferry
Att'ys.

# UNITED STATES PATENT OFFICE.

WILLIAM STANLEY, JR., OF GREAT BARRINGTON, MASSACHUSETTS, ASSIGNOR, BY MESNE ASSIGNMENTS, TO THE WESTINGHOUSE ELECTRIC AND MANUFACTURING COMPANY, OF PITTSBURG, PENNSYLVANIA.

ALTERNATE-CURRENT ELECTRIC MOTOR.

SPECIFICATION forming part of Letters Patent No. 508,188, dated November 7, 1893.

Application filed October 23, 1888. Serial No. 288,985. (No model.)

*To all whom it may concern:*

Be it known that I, WILLIAM STANLEY, Jr., a citizen of the United States, residing in Great Barrington, in the county of Berkshire and State of Massachusetts, have invented a certain new and useful Improvement in Alternate-Current Electric Motors, (Case No. 246,) of which the following is a specification.

The invention relates to the class of electric motors designed to be operated by alternating electric currents.

The object of the invention is to provide an electric motor which may be connected in the circuit of any suitable source of alternating electric currents and driven at a speed suited to the requirements of the service to be performed.

The invention consists, in general terms, in winding the armature and field-magnet with separate coils which are separately connected, and applying to the armature, or surrounding the same by, a coil designed to assist the armature coils in polarizing the armature. This supplemental coil is connected in circuit with the armature coils. As the armature revolves under the influence of alternating electric currents, caused to traverse the field-magnet coils, current is induced in the armature coils, polarizing the same and causing it to revolve. This current traverses the supplemental coil in such direction that it tends to induce poles therein at any given moment in the proper direction to add to the polarization of the armature.

The accompanying drawing is an end view of a motor embodying the features of the invention.

Referring to the figure, A' represents the field-magnet of the motor, and A the magnetizing coils applied thereto. These are designed to be connected in circuit with any suitable source of alternating electric currents. The armature D is mounted to revolve between the poles, N, S, of the field-magnet. The cores of both the armature and the field-magnet are preferably laminated or subdivided in a direction approximately parallel to the direction of polarization. A coil B is so located, with reference to the armature and the poles N S, that it will tend to establish poles for the armature which are in the same direction as the poles N S. For this purpose the coil B is here shown as having its plane at right angles to the plane of the poles and surrounding the armature. This angle may, however, be somewhat varied. The coil B is connected between the brushes $c'$, $c^2$, of the commutator C. The currents, therefore, which flow through or are developed in the armature traverse the coil B. The connections are such that these currents flow in the proper direction to polarize the armature in the same direction as the maximum inductive effects of the currents flowing in the armature wire. This coil B serves to assist the motor in maintaining a constant speed under varying loads, for it increases the magnetic couple of the armature as more current flows through it.

Instead of connecting the field-magnet, or stationary element in circuit with the source of electric currents, the armature or movable element may be so connected. The coils B will serve to increase the torque of the motor as before.

I claim as my invention—

1. An electric motor having magnetizing coils designed to be connected in a source of alternating electric currents, and a supplemental coil surrounding the armature, and assisting, in its polarizing effects, the armature coils and connected in a circuit receiving currents by induction from the first-named coils.

2. An alternating current electric motor consisting of armature and field-magnet coils separately wound and separately connected, and a supplemental coil surrounding the armature and connected in circuit therewith, and assisting in its polarizing effects the armature coils.

3. In an alternating current electric motor the combination of an armature, the commutator, its brushes with which the terminals of the armature coils are connected, and a stationary independent magnetizing coil surrounding the armature, and having its plane at an angle to the plane of the field-magnets, and designed to be traversed by currents assisting the polarizing effects of the armature coils.

4. In an alternating current electric motor, the combination of armature and field-magnet coils separately connected, and a coil surrounding the armature and assisting in its polarizing effects, the armature coil.

In testimony whereof I have hereunto subscribed my name this 12th day of October, A. D. 1888.

WILLIAM STANLEY, Jr.

Witnesses:
CHARLES A. TERRY,
C. C. WOLFE.